US006219961B1

(12) United States Patent
Ballard et al.

(10) Patent No.: US 6,219,961 B1
(45) Date of Patent: *Apr. 24, 2001

(54) APPARATUS AND METHODS FOR CONTROLLING ARTHROPODS

(75) Inventors: James B. Ballard, Medford, NJ (US); Barry Schwartz, Yardley, PA (US); Richard C. Lewis, Tampa, FL (US)

(73) Assignee: FMC Corporation, Philadelphia, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/165,841

(22) Filed: Oct. 2, 1998

(51) Int. Cl.$^7$ ................................................ A01M 25/00
(52) U.S. Cl. .................................................. 43/131
(58) Field of Search ................................ 43/131, 132.1, 43/121, 124

(56) References Cited

U.S. PATENT DOCUMENTS

| 1,372,780 | * | 3/1921 | Schenke . |
| 2,977,711 | * | 4/1961 | Starr . |

(List continued on next page.)

FOREIGN PATENT DOCUMENTS

| 503 403 | | 2/1978 | (AU) . | |
| 2243252 | * | 9/1971 | (DE) | 43/131 |
| 1068066 | * | 9/1952 | (FR) | 43/131 |
| WO 93/23998 | | 12/1993 | (WO) . | |

OTHER PUBLICATIONS

Chemical Patents Index, Documentation Abstracts Journal. Section Ch, Week 9006, Apr. 4, 1990, Derwent Publications Ltd., London, GB; Class C, AN 041587 & JP A 1 319 401 (System Maintenance) Dec. 25, 1989.

Journal of Economic Entomology. vol. 84, No. 5, Oct. 1991, College Park, Maryland, US; pp. 1525–1531, N–Y SU et. al. "Suppression of Foraging Populations of the Formosan Subterranean Termite (Isoptera:Rhinotermitidae) by Field Applications of a Slow Acting Toxicant Bait." (Nan–Yao Su, Paul M. Ban and Rudolf H. Scheffrahn).

Systematic Termite Control$^{SM}$ Brochure, FMC Corporation, printed in Oct., 1998, available for dissemination on Nov. 4, 1998.

Termatrol Pro$_{TM}$ Advertisement, Sector Diagnostics L.L.C., believed to be made known to one of the Applicants in Jun., 1998.

*Primary Examiner*—Charles T. Jordan
*Assistant Examiner*—Francis T. Palo
(74) *Attorney, Agent, or Firm*—FMC Corporation

(57) ABSTRACT

Arthropod containment devices are provided comprising a base plate having a first face, a second face opposite the first face, an outer edge between the first face and the second face; and a containment ridge protruding from the first face along at least a portion of the outer edge, the containment ridge defining a containment region proximate the first face. Also provided are arthropod containment devices comprising a base plate having a first face and a second face opposite the first face, a plurality of guide ridges that protrude from the first face and define at least one containment region, and an arthropod toxicant coated upon or positioned within the containment region.

17 Claims, 4 Drawing Sheets

U.S. PATENT DOCUMENTS

| | | | |
|---|---|---|---|
| 3,088,241 | * | 5/1963 | Sbrojavacca . |
| 3,978,607 | * | 9/1976 | Piere ........................ 43/131 |
| 4,208,829 | * | 6/1980 | Manning . |
| 4,761,912 | * | 8/1988 | Dyer .......................... 43/121 |
| 4,821,452 | * | 4/1989 | Beckley ..................... 43/131 |
| 4,988,510 | | 1/1991 | Brenner et al. ............ 424/84 |
| 5,090,153 | * | 2/1992 | Mullen ....................... 43/114 |
| 5,152,097 | | 10/1992 | Rhodes . |
| 5,390,441 | * | 2/1995 | Pence ......................... 43/131 |
| 5,528,854 | * | 6/1996 | Antonali ..................... 43/131 |
| 5,555,672 | | 9/1996 | Thorne ....................... 43/124 |
| 5,573,760 | | 11/1996 | Thorne ....................... 424/84 |
| 5,746,021 | | 5/1998 | Greene . |
| 5,832,658 | * | 11/1998 | Random ...................... 43/131 |
| 5,901,496 | | 5/1999 | Woodruff .................... 43/124 |
| 5,950,356 | | 9/1999 | Nimocks ..................... 43/131 |
| 6,003,266 | | 12/1999 | Woodruff .................... 43/124 |
| 6,016,625 | | 1/2000 | Bishoff et al. ............ 43/121 |
| 6,023,879 | | 2/2000 | Katz et al. ................ 43/131 |

* cited by examiner

FIG. 5
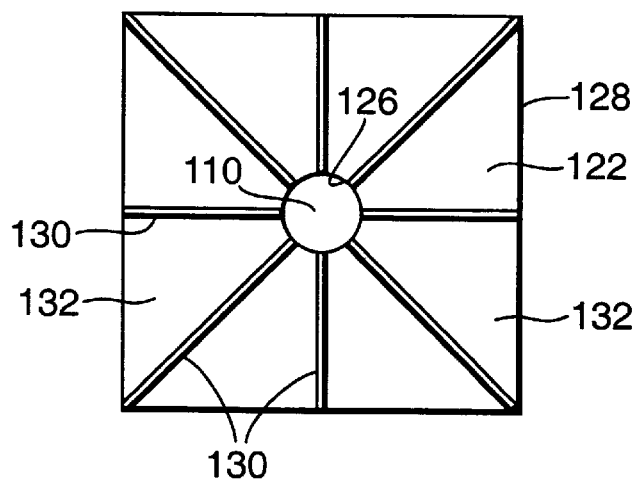
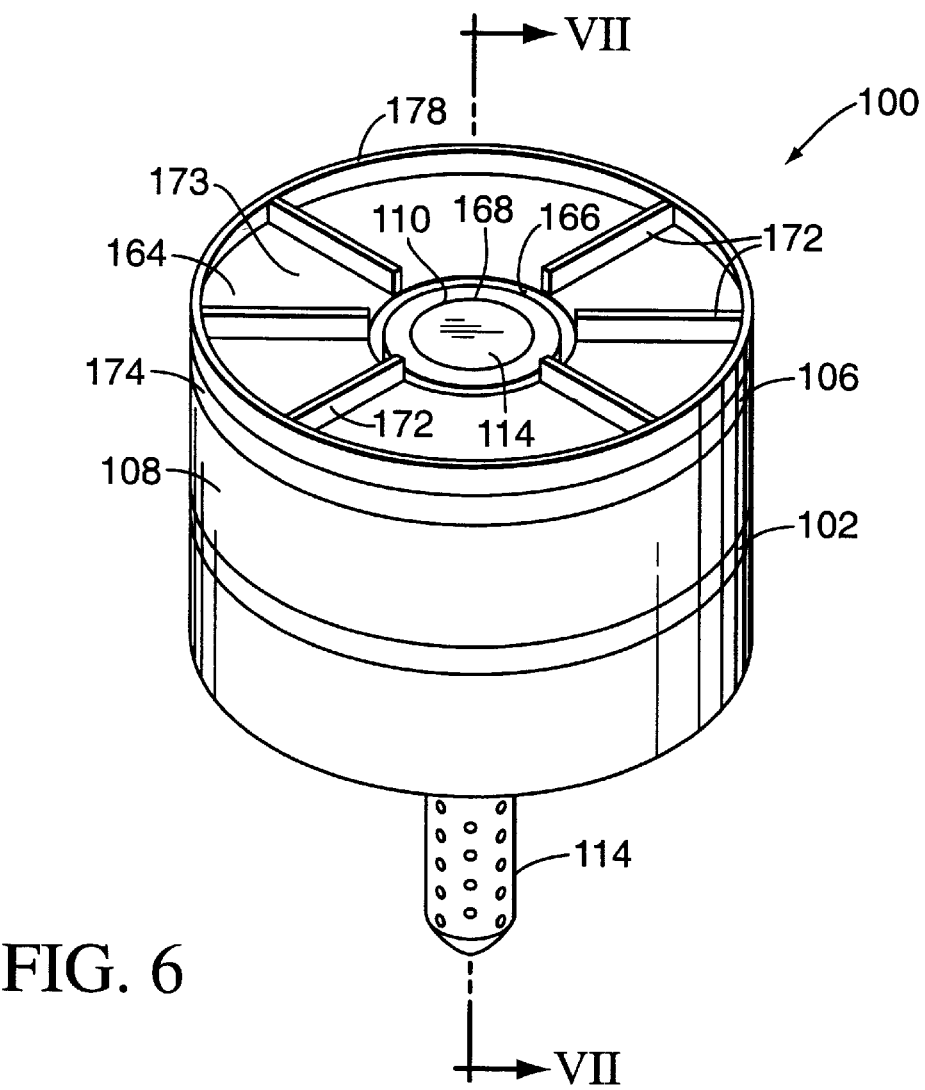
FIG. 6

APPARATUS AND METHODS FOR CONTROLLING ARTHROPODS

BACKGROUND OF THE INVENTION

The present invention relates to the control of arthropods such as termites and, in particular, to devices that lie on the ground and can be used to restrict and/or direct the movement of arthropods.

Termites are well known throughout most areas of the world as insects that attack and destroy wooden structures. Subterranean termites most often enter structures from the surrounding soil to feed on wood or other cellulosic material of the structure and its contents. Many methods for killing termites have been employed over the years. One such method involves applying a toxicant (i.e., a material that kills or repels termites) to the soil in the vicinity of a structure that is to be protected from termites. Not only is this type of treatment labor intensive and raises issues about soil contamination, but the application may not produce an adequate barrier to termite infestation.

Another approach to termite control involves the insertion of wooden stakes or some other suitable termite bait material into the soil around the periphery of the structure to be protected, monitoring the stakes for infestation, and then applying a toxicant to the soil only in those areas in which infestation is observed. This approach minimizes use of the toxicant, yet presents other problems. The bait stakes, for example, do not provide a continuous barrier around the structure, as they typically occupy limited area and, moreover, are separated from one another by a distance on the order of feet or even yards. Termite populations located in the soil can have difficulty locating the bait stakes in the first place, especially if the bait stakes are widely spaced and located on a predetermined interval irrespective of conditions around a structure conducive to termite attack, such as moist areas around a structure. Also, removal of the bait stakes can disrupt the system of passageways leading to the stake that termites may have constructed and, in turn, can disrupt the flow of termites to the stake upon stake re-insertion. These problems are said to be addressed by U.S. Pat. Nos. 5,573,760 and 5,555,672, both in the name of Thorne et al., which disclose insertion into the ground of a stationary housing that not only contains a removable bait cartridge but also possesses a plurality of extensions which are said to intercept or obstruct the path of termites in the vicinity of the housing.

Like "bare" bait stakes, however, the devices disclosed by Thorne, et al., are subterranean devices that typically are inserted completely into the soil so as to be flush with its surface. Accordingly, it often can be difficult to locate such structures after insertion for purposes of further monitoring.

Consequently, there is a need in the art for devices that are more easily located than subterranean bait/toxicant devices and/or for some means for locating such devices. Additionally, there is a need to arrest termites that may be near a subterranean device and to direct them to such a device.

SUMMARY OF THE INVENTION

In one aspect, the present invention provides arthropod containment devices that comprise a base plate having a first face, a second face opposite the first face, and an outer edge between the first face and the second face. Such devices further comprise a containment ridge protruding from the first face along at least a portion of the outer edge, the containment ridge defining a containment region proximate the first face. In preferred devices, the base plate has an inner edge between the first and second faces defining an aperture within the base plate and, optionally, a housing positioned within the aperture having a cavity that comprises a material that is capable of being consumed, penetrated, or transported by arthropods or of killing arthropods following contact therewith. The devices of the invention can further comprise a plurality of guide ridges that protrude from the first face and define at least one containment channel. Such guide ridges preferably lie substantially along an axis extending from the outer edge to the inner edge. Certain containment devices further comprise a cover plate that has a first face and a second face, the cover plate being affixed to the base plate so as to form at least one reservoir between the cover plate and the base plate.

The present invention also provides arthropod containment devices that comprise a base plate having a first face and a second face opposite the first face, a plurality of guide ridges that protrude from the first face and define at least one containment region, and an arthropod toxicant coated upon or positioned within at least a portion of the containment region. Such devices can further comprise a containment ridge protruding from the first face along at least a portion of the outer edge. In preferred devices, the base plate has an inner edge between the first and second faces defining an aperture within the base plate and, optionally, a housing positioned within the aperture having a cavity that comprises a material that is capable of being consumed, penetrated, or transported by arthropods or of killing arthropods following contact therewith. Such devices can further comprise a cover plate that has a first face and a second face, the cover plate being affixed to the base plate so as to form at least one reservoir between the cover plate and the base plate.

In preferred embodiments, the devices of the invention are placed on the ground such that the first face of the base plate faces downward and the containment ridge and/or the guide ridges contact the ground.

BRIEF DESCRIPTION OF THE DRAWINGS

The foregoing summary, as well as the following detailed description of the preferred embodiments, is better understood when read in conjunction with the appended drawings. For the purpose of illustrating the invention, the drawings show certain preferred embodiments. It is understood, however, that the invention is not limited to the specific methods and devices disclosed. In the drawings:

FIG. 5 shows a plan view of a preferred arthropod containment device as seen looking toward the first face of the base plate;

FIG. 6 shows a perspective view of a preferred arthropod containment device including a reservoir.

DETAILED DESCRIPTION OF THE INVENTION

Figure 1:
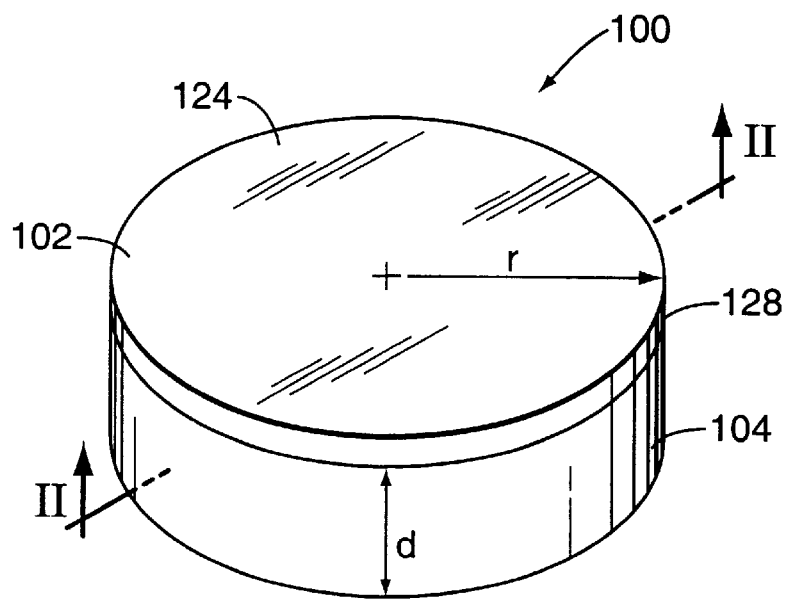
FIG. 1 shows a perspective view of a preferred arthropod containment device according to the present invention.
Figure 2:
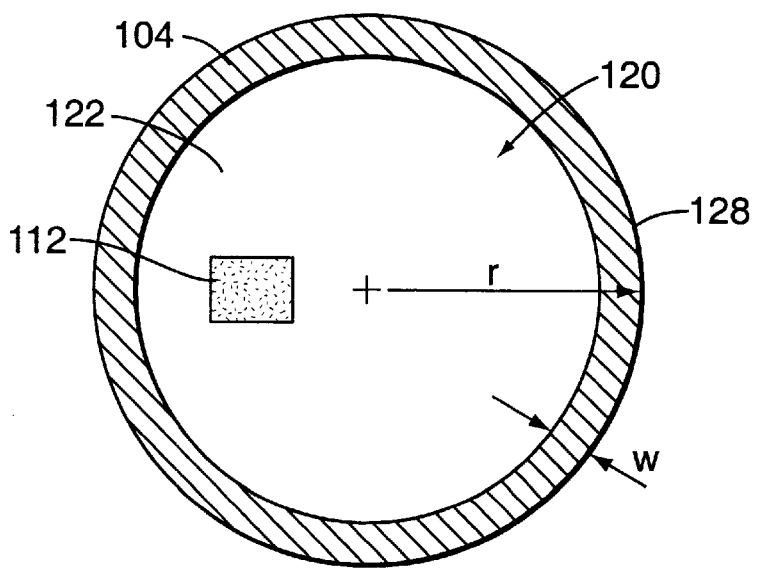
FIG. 2 shows a cross sectional view of the device of FIG. 1 taken along line II—II.

FIGS. 1 and 2 show a preferred arthropod containment device 100 according to the present invention comprising a base plate 102 and a containment ridge 104. Base plate 102 has a first face 122 and a second face 124 substantially opposite first face 122, as shown. Preferably, base plate 102 has a thickness (i.e., distance between first face 122 and second face 124) of about 0.06 inches to about 6 inches. In the embodiment shown in FIGS. 1 and 2, first face 122 and second face 124 both are substantially planar and parallel, although they need not be.

Base plate 102 has an outer edge 128 between first face 122 and second face 124. Containment ridge 104 protrudes from first face 122 along at least a portion of outer edge 128 and defines the outer periphery of a containment region 120 proximate first face 122. Although outer edge 128 in FIG. 1 is circular, it need not be. Outer edge 128 can also be a square (as in FIG. 5), a triangle, or any other closed plane shape. Preferably, arthropod containment device 100 has a radius, r, of about 1 to about 24 inches; more preferably about 5 to about 9 inches. For embodiments where outer edge 128 is non-circular, the distance across base plate 102 ranges preferably is about 2 inches to about 50 inches, more preferably about 10 inches to about 20 inches.

Containment ridge 104 has a width, w, and protrudes a distance, d, from first face 122. Width, w, preferably is about 0.03 inches to about 0.5 inches, and distance, d, preferably is about 0.1 inches to about 0.5 inches. More preferably, width, w, is about 0.1 inches to about 0.2 inches and distance, d, is about 0.2 inches to about 0.3 inches.

Arthropod containment device 100 may be made of any moisture-permeable or moisture-impermeable material, including, without limitation, plastic (i.e., synthetic polymer), wood, plaster, concrete, asphalt, tile, brick, masonry, ceramic, metal, rigid polymeric foam, composites of two or more materials, and laminates of suitable sheet materials. It is preferred that device 100 be fabricated from a rigid or flexible plastic, and is preferably polyethylene. Arthropod containment device 100 can be pressed, molded, extruded, or otherwise formed from several parts.

To attract termites or other arthropods into containment region 120, device 100 is positioned such that first face 122 faces toward the ground or some other body suspected of termite infestation. Thus, containment region 120 is defined beneath arthropod containment device 100. The device 100 should be of a size and mass that is sufficient to retain moisture when it is placed on the ground, as it is well known that moisture attracts arthropods such as termites. Device 100, however, can be used to attract a wide variety of other arthropods such as, for example, ants, roaches, yellow jackets, bees, wasps, and scorpions.

To arrest any arthropods that are drawn into containment region 120, an arthropod toxicant can be coated onto at least a portion of the containment region or a penetrable material 112 can be positioned within the containment region. An arthropod toxicant according to the invention is any material that kills or repels an arthropod following consumption by or contact with the arthropod. Preferred toxicants include, but are not limited to, sulfluramid, hydramethylnon, imidacloprid, chitin inhibitors, juvenile hormone analogs, biological agents (e.g., spores, mycelium, or toxins), pyrethroids, berates, protazoacides, and anti-bacterial agents. Penetrable materials according to the invention include wood, sawdust, rigid foam insulation, and any other material capable of being moved, transported, tunneled into, or ingested by arthropods. The definition of penetrable material thus includes any toxicant that is ingested or contacted by arthropods, including any penetrable material that is treated with toxicant and ingested or contacted by arthropods. Penetrable material 112 preferably is positioned such that arthropods drawn into containment region 120 come in contact with penetrable material 112. Such contact can involve consumption of the material by the arthropod, burrowing of the arthropod in the penetrable material, and/or transport of the material from one location to another.

Figure 3:
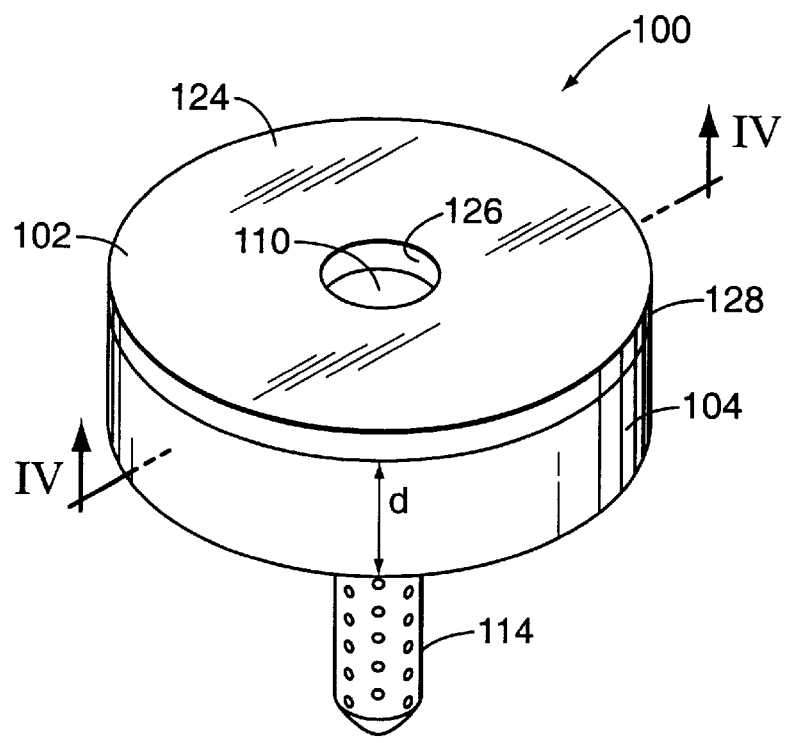
FIG. 3 shows a perspective view of another preferred arthropod containment device according to the present invention.
Figure 4:
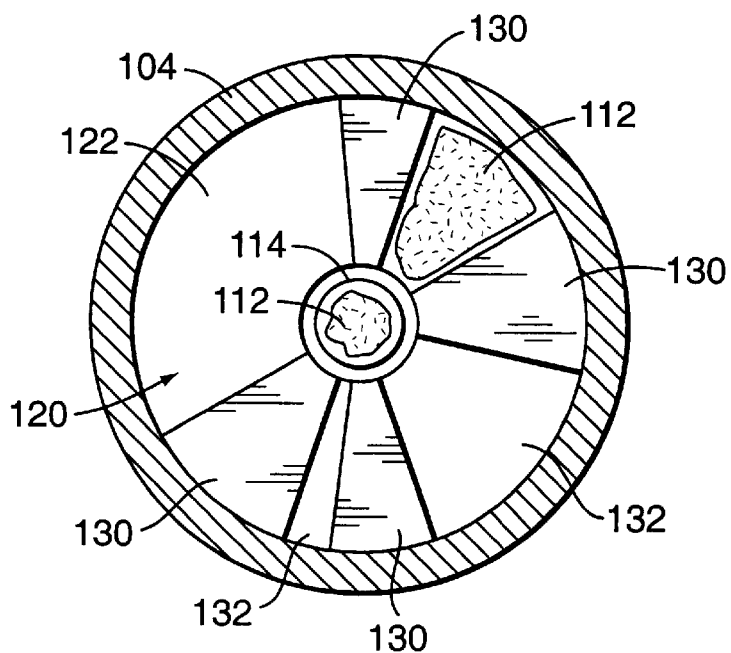
FIG. 4 shows a cross sectional view of the device of FIG. 3 taken along line IV—IV.

FIGS. 3 and 4 show another preferred embodiment of an arthropod containment device 100 according to the present invention. As shown in FIGS. 3 and 4, base plate 102 has an inner edge 126 that lies between first face 122 and second face 124, and defines an aperture 110. To arrest or exterminate arthropods that are drawn into containment region 120, a penetrable material 112 can be positioned within aperture 110. For example, after placing arthropod containment device 100 on the ground as described above, a wooden dowel (optionally treated with an arthropod toxicant) can be inserted into the ground through aperture 110.

In certain embodiments, containment device 100 can be used with an arthropod bait/monitoring station 114. Station 114 typically comprises a housing having apertures 116 and an internal cavity wherein a material that is capable of being consumed, penetrated, or transported by arthropods or of killing arthropods following contact therewith is placed. In use, arthropod containment device 100 is positioned on the ground in such a way that station 114 is positioned somewhere within aperture 110. Thus, the moist footprint of arthropod containment device 100 draws arthropods to the area where station 114 is located, and the material (e.g., penetrable material 112) within station 114 attracts the arthropods drawn into containment region 120 into station 114. Additionally, since arthropod containment device 100 is located above the ground yet proximate station 114, arthropod containment device 100 aids the pest control operator in locating station 114.

The particular shape of inner edge 126 is not believed to be critical. Preferably, as shown in FIGS. 3 and 4, inner edge 126 (and, consequently, aperture 110) is circular. Aperture 110 may be any size, and should be sufficiently large to accommodate, for example, the penetrable material 112 or bait/monitoring station 114 being used. Aperture 110 should have a diameter, d, of from about 1 to about 10 inches, preferably about 2 inches.

FIG. 5 shows a plan view of one arthropod containment device 100 of the invention in which a plurality of guide ridges 130 protrude from first face 122 and define at least one containment channel 132. Guide ridges 130 can be of virtually any size and shape, so long as they protrude from first face 122. Guide ridges 130 can, for example, be significantly wider than containment channels 132. In such an embodiment, containment channels 132 would appear more like grooves scored into in first face 122 of base plate 102.

Preferably, arthropod containment device 100 has eight guide ridges 130. In preferred devices which include aperture 110, each guide ridge 130 lies substantially along an axis extending from outer edge 128 to inner edge 126. Preferably, guide ridges 130 extend across first face 122 the entire distance from inner edge 126 to outer edge 128, although they need not do so. The guide ridges preferably are from about 0.1 inches to about 0.5 inches deep, preferably about 0.2 to about 0.3 inches deep, and about 0.03 inches to about 0.5 inches wide, more preferably about 0.1 to about 0.2 inches wide. The width of the guide ridges 130 varies inversely with that of the containment channels 132, which preferably are from about 0.03 inches to about 0.2 inches wide, more preferably about 0.05 to about 0.1 inches wide.

As shown in FIG. 5, guide ridges 130 can radiate at fixed and equal angles from inner edge 126 to form containment channels 132 between neighboring guide ridges. While not wishing to be limited to any particular theory, guide ridges 130 are believed to direct arthropods along containment channels 132 toward a predetermined location such as a bait/monitoring station 114 located within aperture 110. An arthropod containment device 100 having a plurality of guides ridges 130 may or may not also have a containment ridge 104 disposed along outer edge 128 to assist in the direction of arthropods.

Containment channels 132 can be left open, coated with a toxicant, and/or filled with a penetrable material 112 of the type described above. Penetrable material 112 optionally can include a feeding stimulant that hastens direction of the arthropods to the desired location.

Figure 7:
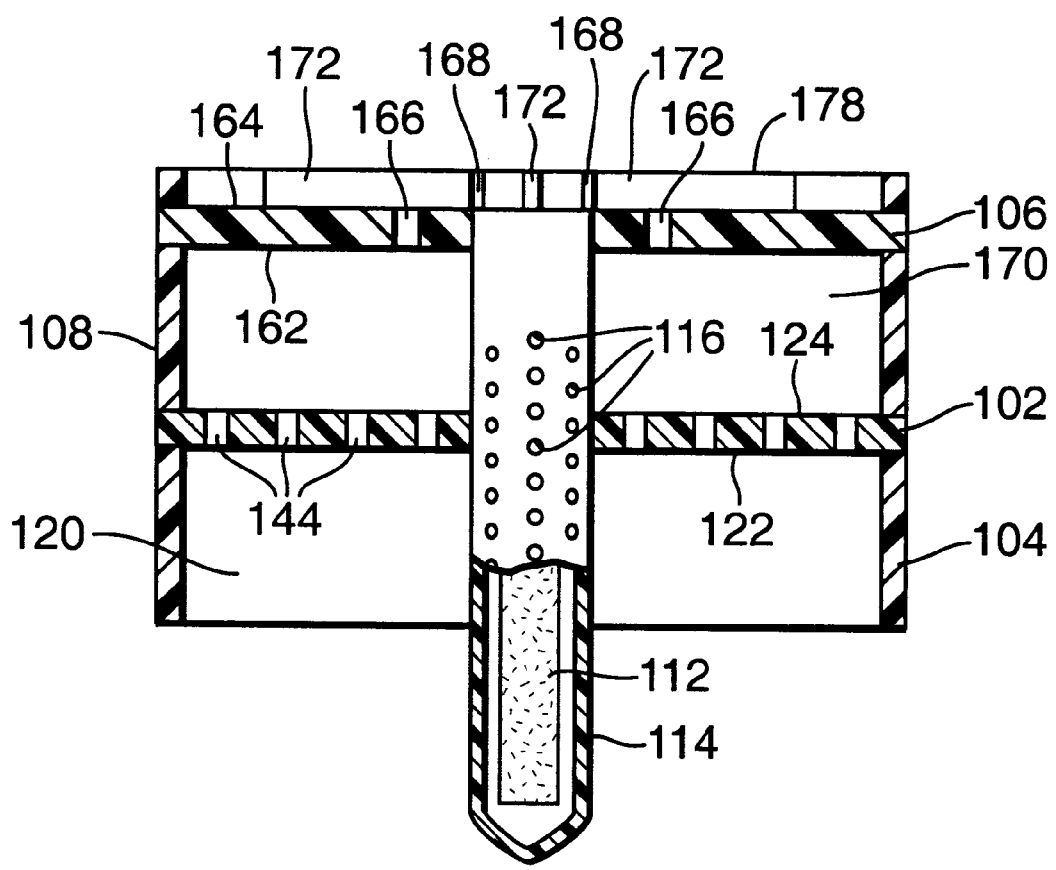
FIG. 7 shows a cross sectional view of the device of FIG. 6 taken along line VII—VII.

FIGS. 6 and 7 show a preferred embodiment of an arthropod containment device 100 including a reservoir 170. As shown in these figures, a cover plate 106 is affixed to base plate 102 and, in tun, has a first face 164 and a second face 162. Cover plate 106 is affixed to base plate 102 so as to form at least one reservoir 170 between second face 124 of base plate 102 and second face 162 of cover plate 106. Preferably, cover plate 106 and base plate 102 are formed from a single piece of plastic having at least one hollow interior portion forming reservoir 170. It is contemplated, however, that cover plate 106 can be a separate piece that is affixed to base plate 102 via a wall 108.

Reservoir 170 serves to retain a fluid, such as, for example, rainwater or a liquid bait. Preferably, base plate 102 has at least one outlet 144 extending from reservoir 170 to first face 122. Outlet 144 allows the fluid stored in reservoir 170 to gradually leak into containment region 120, helping arthropod containment device 100 to maintain a moist footprint. As shown in FIGS. 6 and 7, base plate 102 can have a plurality of outlets 144 or holes. Similarly, cover plate 106 can have at least one inlet 166 that extends from first face 164 to reservoir 170 and assists transferring rainwater or other liquids from the first face to the reservoir. As shown in FIGS. 6 and 7, inlet 166 can be a slot proximate inner edge 168 of cover plate 106. As shown, the slot is circular and circumscribes aperture 110, although it need not be configured in this way. Inlet 166 allows rainwater hitting cover plate 106 to flow into reservoir 170. Alternatively, inlet 166 allows a person to simply pour water or other fluids into reservoir 170 via inlets 166.

As shown in FIGS. 6 and 7, cover plate 106 may also have a plurality of gutter ridges 172 extending from inlet 166 toward outer edge 174 of cover plate 106. Gutter ridges 172 form gutters 173 that serve to direct rainwater hitting cover plate 106 to inlet 166 and, consequently, into reservoir 170. Gutter ridges 172 preferably are from about 0.1 to about 0.5 inches deep and from about 0.03 inches to about 0.5 inches wide, more preferably about 0.2 to about 0.3 inches deep and about 0.1 to about 0.2 inches wide. Cover plate 106 can be concave (i.e., curve away from base plate 102 at its edges) so that rainwater or other fluids simply flow down first face 164 into inlet 166. Finally, arthropod containment device 100 may have a plurality of inlets 166, or holes, in cover plate 106.

In a preferred embodiment, gutter ridges 172 radiate equi-angularly from outer edge 174 to inlet 166, or to a ridge 178 that extends from first face 164 of cover plate 106 and is disposed along at least of portion of outer edge 174. Gutters 176 catch and direct rain water from the radial slot or ridge to the circular slot or ridge which in turn directs the water into the reservoir. Preferably, ridge 178 is about 0.2 to about 0.3 inches deep and about 0.1 to about 0.2 inches wide, but may range from about 0.1 inches to about 0.5 inches deep and from about 0.03 inches to about 0.5 inches wide.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

We claim:

1. An arthropod containment device comprising:

a base plate having a first face, a second face opposite said first face;

a plurality of guide ridges and a containment ridge that protrude from said first face, said containment ridge in contact with a surface suspected of arthropod infestation, which contact forms at least one containment region; and, an arthropod toxicant coated upon or positioned within at least a portion of said containment region.

2. The device of claim 1 wherein said base plate has an inner edge between said first face and said second face defining an aperture within said base plate.

3. The device of claim 2 wherein a material capable of being consumed by arthropods, penetrated by arthropods, transported by arthropods, or of killing arthropods following contact therewith is positioned within said aperture.

4. The device of claim 3 further comprising a housing positioned within said aperture, said housing having a cavity which comprises said material.

5. The device of claim 1 wherein between said first face and said second face there is an inner edge and an outer edge, and wherein said guide ridges lie substantially along an axis extending from said outer edge and said inner edge.

6. The device of claim 1 further comprising a cover plate that has a first face and a second face, said cover plate being affixed to said base plate so as to form at least one reservoir between said cover plate and said base plate.

7. The device of claim 6 wherein said cover plate has at least one inlet from said first face of said cover plate to said reservoir.

8. The device of claim 7 wherein said base plate has at least one outlet extending from said reservoir to the first face of said base plate.

9. A method comprising the step of placing the arthropod containment device of claim 1 on the ground where arthropod control is desired whereby said guide ridges, said containment ridge, and said ground form at east one containment region proximate said first face and said ground.

10. An arthropod containment device comprising:

a base plate having a first face, a second face opposite said first face, an outer edge between said first face and said second face; a containment ridge protruding from said first face along at least a portion of said outer edge, said containment ridge defining a containment region between said first face and a surface suspected of arthropod infestation, an inner edge between said first face and said second face defining an aperture within said base plate, and a plurality of guide ridges protruding from said first face, said guide ridges lying substantially along an axis extending from said outer edge to said inner edge defining at least one containment channel.

11. A method comprising the step of placing the arthropod containment device of claim 10 on the ground where arthropod control is desired whereby said containment ridge contacts said ground and forms a containment region proximate said first face and said ground.

12. The device of claim 10 wherein a material capable of being consumed by arthropods, penetrated by arthropods, transported by arthropods, or of killing arthropods following contact thereof is positioned within said aperture.

13. The device of claim 12 further comprising a housing positioned within said aperture, said housing having a cavity which comprises said material.

14. The device of claim 10 further comprising a cover plate that has a first face and a second face, said cover plate being affixed to said base plate so as to form at least one reservoir between said cover plate and said base plate.

15. The device of claim 14 wherein said cover plate has at least one outlet extending from said first face of said cover plate to said reservoir.

16. The device of claim 14 wherein said base plate has at least one outlet extending from said reservoir to said first face of said base plate.

17. A method comprising the step of placing the arthropod containment device of claim 10 on the ground where arthropod control is desired whereby said guide ridges, and said containment ridge contact said ground and form at least one containment channel proximate said first face and said ground.

* * * * *